United States Patent Office 3,489,743
Patented Jan. 13, 1970

3,489,743
PROCESS FOR THE MANUFACTURE OF CELLULOSE ESTERS AND ETHERS OF POLYCARBOXYLIC ACID
Carlton L. Crane, Webster, N.Y., assignor to Eastman Kodak Company, Rochester, N.Y., a corporation of New Jersey
Continuation-in-part of application Ser. No. 717,045, Mar. 28, 1968, which is a continuation-in-part of application Ser. No. 282,230, May 22, 1963. This application Jan. 2, 1969, Ser. No. 788,652
Int. Cl. C08b 3/12, 3/16
U.S. Cl. 260—225                                17 Claims

ABSTRACT OF THE DISCLOSURE

It has been discovered that calculated, stoichiometric amounts of polycarboxylic acid acyl groups can be incorporated into cellulose esters and/or ethers using essentially stoichiometric amounts of polycarboxylic anhydride, provided that (a) the esterification is carried out initially under "hydrous" conditions, and (b) after about half of the dicarboxylation an amount of lower fatty acid anhydride is introduced into the reaction mixtures, which amount is not quite enough to make the mixtures anhydrous.

---

This patent application is a continuation-in-part of United States patent application Ser. No. 717,045, filed Mar. 28, 1968 (now abandoned), which is a continuation of United States patent application Ser. No. 606,556, filed Jan. 3, 1967 (now abandoned), which in turn is a continuation-in-part of United States patent application Ser. No. 282,230, filed May 22, 1963 (also abandoned now).

This invention relates to special processes for the introduction of polycarboxylic acyl groups into cellulosic esters, ethers or ether/esters which contain hydroxyl groups.

In general, the present processes involve:

(a) Contacting the presence of a basic catalyst, (i) the celluloisic "raw" material (while it is dissolved in a "hydrous" reaction medium containing at least one lower carboxylic acid containing from 2 to 5 carbon atoms with (ii) approximately the stoichiometric amount of polycarboxylic acid anhydride that is to be reacted with the cellulosic material (i.e., substantially no "excess" polycarboxylic acid anhydride) to thereby initiate the reaction of (i) with (ii), (b) Subsequently, within a certain critical stage of the reaction, adding an amount of lower fatty acid anhydride to the resulting esterification mixture, this amount being between 50% and 100% of that amount calculated to combine with all of the water present in the esterification mixture at that time (this being less than sufficient to render the esterification mass anhydrous); and (c) Then completing the esterification.

Methods have been described for making cellulose acetate phthalates by treating cellulose acetate starting material with a bath of acetic acid, water and sulfuric acid followed by neutralizing the sulfuric acid catalyst and esterifying the cellulose acetate with dicarboxylic acid anhydride and catalyst. In the previously described methods the use of a large excess of polycarboxylic anhydride over that necessary to react with the available hydroxyls has been necessary to promote the esterification; particularly to obtain products having substantial phthalyl (or the like) contents. In those procedures addition of acetic anhydride to remove water prior to the esterification has been suggested. These methods have been of limited value and have resulted in the introduction of appreciable amounts of acetyl into the cellulose esters along with only minimal amounts of the desired polycarboxylate groups.

One object of my invention is to provide a method of preparing cellulose esters containing both lower fatty acid radicals and polycarboxylic acid radicals in which polycarboxylic anhydride is partially reacted with the cellulosic "raw" material prior to the time lower fatty acid anhydride is added to the bath. Another object of my invention is to provide a method in which the polycarboxylic cellulose ester product can be purified with fewer washes and at higher temperatures than has been previously found to be the case. A further object of my invention is to provide a purified polycarboxylic cellulose ester and/or ether that is highly resistant to hydrolysis, containing more combined polybasic acyl than has been possible to introduce by commercially practical methods heretofore. A still further object of my invention is to provide a rapid method for preparing polycarboxylic acid esters and ethers of cellulose. A still further object of my invention is to provide a process for making cellulose esters and ethers containing both lower fatty acid and polycarboxylic acid radicals, in which the amount of reagent which is employed to impart the polycarboxylic acid radicals is selected to correspond with the amount of those radicals desired in the ester obtained, thus leaving a low amount of residual polycarboxylic acid to be removed from the reaction mixture. Other objects of my invention will appear herein.

I have found that by the addition of aliphatic anhydrides such as acetic, propionic, or butyric anhydride, to the reaction mixture in an amount at least 50% equivalent (but short of complete equivalency) to the amount of water present after the esterification is approximately 50% completed, that essentially fully esterified cellulose ester polycarboxylates of good hydrolytic stability and very high polycarboxylate content can be obtained. I have found that by my method the amount of polycarboxylic acid radical substitution can be controlled by the amount of polycarboxylic anhydride which is supplied to the esterification mass, so that cellulose acid polycarboxylates having desired hydroxyl and polycarboxylate contents can be obtained. I have found that by carrying out the esterification in this fashion little, if any, residual free polycarboxylic acid remains; hence, the difficulties of purifying the final product are minimized and the number of washes can be reduced. I have found that cellulose esters obtained in accordance with my invention have excellent hydrolytic stability, hence can be purified by washing at higher temperatures than could be tolerated heretofore. I have found that my process admits of preparing cellulose acetate polycarboxylates with increased amounts of polycarboxylic acid up to (if desired) complete substitution of hydroxyl groups. Resistance of the final product to hydrolysis by water is in proportion to the type of substituent group and to the degree of esterification of the hydroxyl by polycarboxylate radicals. Resistance to hydrolysis by water appears to be particularly good with products containing combined tetra- and hexa-hydrophthalate groups. The amount of alkali metal salt needed to catalyze the reactions in accordance with my invention may be kept to a minimum.

I have also discovered that the processes of my invention are useful in the manufacture of hydrolytically stable polycarboxylic acid esters of (a) lower alkyl cellulose ethers, and even (b) lower alkyl cellulose ether/esters (in which both lower alkyl ether and lower alkyl esters groups are substituted on the cellulose molecule). As a matter of fact, problems similar to those described above with respect to conventional processes for introducing polycarboxylic acyl groups into lower alkyl cellulose esters exist with respect to the polycarboxylation of lower alkyl cellulose ethers and lower alkyl cellulose ether/esters. These problems can be solved by using the processes of my present invention.

The cellulose derivatives that are useful in the practice of this invention are those that are soluble to the extent of at least 5 weight percent in a hydrous lower fatty acid bath having a temperature of 30° C., and have the formula

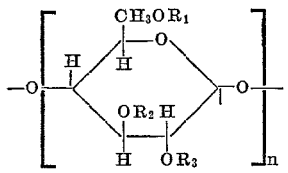

wherein $R_1$, $R_2$ and $R_3$ are members of the group consisting of hydrogen, hydrocarbon groups containing from 1 to about 10 carbon atoms, and acyl groups containing from 2 to about 8 carbon atoms; an average of from about 0.1 to about two of $R_1$, $R_2$ and $R_3$ being hydrogen. When $R_1$, $R_2$ and/or $R_3$ are hydrocarbon groups, it is preferred that such groups contain from 1 to 4 carbon atoms, and when the substituents on the cellulose molecule are acyl groups it is preferred that the acyl groups contain from 2 to 5 carbon atoms. Still further preferred are the cellulose acetates and ethyl celluloses. Those $R_1$, $R_2$ and $R_3$ substituents which are other than hydrogen do not have to be identical. Thus, typical non-limiting examples of useful cellulosic "raw" materials (for reaction with dicarboxylic acid anhydride in the present processes) all contain at least about 0.1 weight percent of hydroxyl (and preferably at least about 1% hydroxyl), all are highly polymeric materials, solid at ambient temperatures, and include, for example, cellulose acetate, cellulose propionate, cellulose butyrate, cellulose valerate, cellulose acetate propionate, cellulose acetate butyrate, cellulose propionate butyrate, cellulose acetate caprate, ethyl cellulose, methyl cellulose, methyl ethyl cellulose, sodium carboxymethyl cellulose, ethyl cellulose acetate, ethyl cellulose propionate, methyl cellulose acetate, cellulose acrylate, 2-chloroethyl cellulose, cellulose acetate chloroacetate and the like. Of all of these, cellulose acetate (containing from about 26 to about 34 weight percent of acetyl and from about 7.6 to about 13.2 weight percent hydroxyl) and ethyl cellulose (containing from about 35 to about 50 weight percent of ethoxyl and from about 0.1 to about 12 weight percent hydroxyl are the "raw" materials that have apparently the greatest potential value after they have been converted to appropriate dicarboxylates, and are therefore particularly preferred.

In its broadest aspects, my invention involves the reaction of (a) one (or a mixture of two or more) of these useful cellulosic "raw" materials in a "hydrous" esterification bath (containing a lower fatty acid such as acetic acid and a basic catalyst such as sodium acetate), with (b) an appropriate dicarboxylic acid anhydride.

Preferably, the amount of polycarboxylic acid anhydride used in the esterification bath is not substantially more than that amount desired to be reacted with the cellulosic "raw" material to yield the desired degree of polycarboxylation in the end product. It can, however, be less than that amount required to react with all of the hydroxyl groups in the cellulosic "raw" material. After 25–75% of the polycarboxylic acid anhydride has reacted with the cellulosic material, lower fatty acid anhydride is added to the bath in an amount only sufficient to combine with between 50 and 100% of the water in the bath (preferably 50–98% equivalent to the water present), but not enough to react with all of the water in the bath. The esterification is then permitted to proceed to the point at which substantially all of the polycarboxylic acid anhydride has been used up in esterifying the hydroxyls of the cellulosic material, or it may proceed only to that point at which a selected combined polybasic acyl has been achieved to obtain a useful product. The time of this second step is not critical and may conveniently be 1–5 hours. The time of this second part of the esterification depends upon several factors such as the temperature of the esterification bath and the amount of polycarboxylic acid anhydride which has been supplied thereto. The esterification may be carried out at a convenient temperature (temperature not being critical). A reaction temperature on the order of 180° F. for instance will give completion of esterification in a relatively short time.

The polycarboxylic anhydrides and esters of greatest interest are the dicarboxylic compounds such as phthalic, tetrahydrophthalic, hexahydrophthalic, succinic, maleic and the like; however, this does not exclude the use of the polycarboxylic compounds having more than 2 carboxyl groups such as trimellitic and the like.

In the procedures in accordance with my invention the liquid to solid ratio is ordinarily 1.2–3:1, "liquid" being based on lower fatty acid and water and "solid" being based on the weight of cellulosic "raw" material on a bone dry basis.

The amount of water in the bath at the time of adding the lower fatty acid anhydride may be readily calculated by taking account of the amounts of water supplied by the addition of the cellulosic ester or ether starting material, the sulfuric and acetic acids, and any other materials present in the esterification bath, accounting for the amounts of water used up in converting unused or excess (of that theoretically required to react with the hydroxyls on the cellulose) polycarboxylic anhydride to acid. By substracting the amount of water used up in converting all of the "excess" anhydride ("excess" of the theoretical amount needed to react with all of the hydroxyls when it is desired to use such an "excess" of polycarboxylic acid anhydride) from the total amount of water which had been supplied by the materials added, the basis for the proportion of lower fatty acid anhydride to be added in the latter stage of the esterification step is conveniently arrived at. For the successful practice of this invention, then, one must add at least enough lower fatty acid anhydride to react with 50% of this amount of both water ("left over" after the above caculations are made), but not enough to react with all of it. The product may be a low viscosity type of ester, ether or ether/ester, but higher viscosity type of products can be obtained, depending upon the viscosity of the cellulosic starting material.

The following examples illustrate my invention:

EXAMPLE 1

33 parts of cellulose acetate (38.8% combined acetyl, 500 cps., viscosity at 10% concentration in acetone at 25° C.) with a moisture content of 3% were mixed with 39.4 parts of 86.3% acetic acid in a jacketed sigmabladed mixer and the mass was heated and stirred until a temperature of 180° F. was attained and the mass was homogeneous.

A mixture of 0.94 part of 95% sulfuric acid and 2 parts acetic acid were added to the mixer and the stirring and heating was continued until the reaction solution reached a viscosity of 3.3 seconds and the acetyl content was approximately 32%. The viscosity was determined from a mixture of 20 grams of the reacted solution in 20 cc. of a 1:1 mixture of glacial acetic acid and distilled water, the viscostiy having been determined by the time required for a 3/32" aluminum ball to drop 7.7 cm. in a ½" diameter test tube at 25° C. One half of a solution of 9.984 parts 90% magnesium carbonate in 2 parts acetic acid was added to the mixer and the balance was then added over a period of 20 minutes.

Cooling water was then circulated through the mixer jacket and 4 parts sodium acetate and 11 parts hexahydrophthalic anhydride were added. The mass was stirred for 15 minutes. Then 11 parts of hexahydrophthalic anhydride were added and the mixing was continued with the temperature maintained at 150° F. for a period of 40 minutes.

17 parts of 97% acetic anhydride were added over a period of 30 minutes. The mass was stirred and heated at 180° F. for a period of 3 hours. The reaction mass was then cooled by circulating cold water through the mixer jacket and sufficient cold distilled water was then added to the mixer to produce a finely divided uniform granular powder.

In calculating the amount of water against which the proportion of acetic anhydride to use is determined the amount of water supplied by the cellulose acetate, the acetic acid, the sulfuric acid, magneium carbonate, etc. added in the preliminary stages is approximately 6.64 parts. Approximately 1.33 parts of this water supplies the hydroxyl supplied for the hydrolysis of the cellulose acetate, hence, the water remaining is approximately 5.31 parts. As only about 75% of the hexahydrophthalic anhydride had been used up at the time of adding the acetic anhydride, approximately 0.65 part of water had converted the remainder of the hexahydrophthalic anhydride to acid leaving 4.56 parts of water still present. This amount of water is equivalent to approximately 26.6 parts of 97% acetic anhydride. With the addition of only 17 parts of 97% acetic anhydride the esterification mass is not rendered anhydrous but at least 50% of the water has been destroyed.

The product was then purified by washing in successive changes of warm distilled water until substantially free from uncombined acids. The dried product on analysis was found to have a hexahydrophthalyl content of 27.1% and a viscosity of 32 cps. at 15% concentration in ethanol/methyl Cellosolve/distilled water/acetone-40/30/20/10% at 25° C. Dry heat stability determined by heating 18 hours at 140° C. was excellent and the color of the white product was practically unchanged.

EXAMPLE 2

24.8 parts of cellulose acetate (39.1% combined acetyl and 500 cps. viscosity at 10% concentration in acetone at 25° C.) with a moisture content of 3.2% were placed in a jacketed sigmabladed mixer together with 25.4 parts of glacial acetic acid and 4 parts of distilled water. The mixture was heated and stirred to 180° F. to form a uniform mass.

A mixture consisting of 0.7 part 95.3% sulfuric acid and 1.5 parts acetic acid was added to the mixer as rapidly as it would disperse into the mass. The temperature was maintained at 180° F. until a viscosity of 1.9 seconds and as acetyl content of approximately 32.8% was obtained as determined in Example 1.

One half of a mixture consisting of 0.74 part 86% magnesium carbonate and 3.15 parts acetic acid were then added to the mixer and the balance was then added over a period of 30 minutes.

At the end of this addition, a portion of the reaction solution was removed from the reaction mixture and precipitated in isopropanol. The purified product was analyzed and found to contain 32.8% combined acetyl.

3 parts sodium acetate and 19.5 parts 95% tetrahydrophthalic anhydride were added to the reaction bath and the mixture was stirred and heated for a period of 1 hour. At the end of this time 19.5 parts of 97% acetic anhydride were added to the mixer over a period of 30 minutes. The reaction temperature was maintained at 180° F. for a period of 3.8 hours. The reaction solution was then cooled by passing cooling water through the mixer jacket and the reaction solution was added to a comminutor together with a stream of distilled water. The product precipitated in the form of a fine granular powder. The product was washed in successive changes of warm distilled water until substantially free from uncombined acids and dried. The dry product had the following analyses. Apparent tetrahydrophthalyl, 34.8%; free tetrahydrophthalic acid, 0.7%; relative hydrolytic stability in water at 120–140° F., 88. After heating dry product 2.5 hours at 140° C. color was essentially unchanged.

In this example the amount of water supplied by the various materials added in the portion up to the completion of the hydrolysis was approximately 4.95 parts. In the hydrolysis operation approximately 0.94 part of water was used up in supplying hydroxyls to the cellulose acetate. This would leave approximately 4.01 parts of water in the bath at the end of the hydrolysis. If the assumption is made that all the available hydroxyls in the cellulose acetate, 32.8% acetyl content, react ultimately with the tetrahydrophthalic anhydride in the bath, 0.21 part of water will be required to convert the excess tetrahydrophthalic anhydride in the bath (after all of the cellulose acetate hydroxyls have been so reacted) to its acid form. Thus, about 0.21 part of water will be used up in converting to acid the "excess" tetrahydrophthalic anhydride, theoretically leaving 3.80 parts of water present. To eliminate this water would require 22.2 parts of 97% acetic anhydride (to convert the bath to the anhydrous state). However, in carrying out this example, only 19.5 parts of 97% acetic anhydride were added to the mixer. Thus the esterification mass is not rendered anhydrous, but at least 90% of the water has been destroyed. By analysis, it was found that the cellulose acetate phthalate had a combined tetrahydrophthalyl content of 18.7% at the time the acetic anhydride was blended into the reaction mixture of this example.

EXAMPLE 3

3.2 parts (39.1% combined acetyl and viscosity at 10% concentration in acetone at 25° C. of 500 cps.) of cellulose acetate with a moisture content of 3% were placed in a jacketed sigmabladed mixer together with a mixture of 1.4 parts distilled water and 8.5 parts of glacial acetic acid.

The mixture was stirred and heated to 180° F. over a period of 25 minutes. 0.236 part 95% sulfuric acid dissolved in 0.5 part acetic acid was then added to the reaction mixture. The temperature was maintained at 180° F. until a viscosity of 4.5 seconds and an acetyl content of 30–33% was obtained as determined in Example 1.

One half of a mixture of 0.248 part 86% magnesium carbonate and 1.05 parts acetic acid were added to the mixer and the balance was then added over a period of 20 minutes. 1.15 parts sodium acetate, 1 part trimellitic anhydride, and 6.5 parts hexahydrophthalic anhydride were added to the mixer and the reaction temperature maintained at 180° F. for one hour. 5.8 parts 97% acetic anhydride were then added to the mixer over a period of 30 minutes and the temperature maintained at 180° F. during this period. The reaction solution was stirred at a temperature of 180° F. for 2 hours, then cooling water was circulated through the mixer jacket. 30 parts of 32–34° F. distilled water were added to the mixer in a slow stream. The mixer was stirred until a finely divided product was obtained. The product was purified by washing in successive changes of warm distilled water until substantially free from uncombined acids. The product was dried.

The dry product analyzed as follows: Combined trimellityl, 4.8%; combined hexahydrophthalyl, 19%; the viscosity at 19% concentration in 3A alcohol/methyl Cellosolve/water-50/30/20% at 25° C., 82 cps. The relative hydrolytic stability, 71. After 2½ hours at 140° C. the product was essentially unchanged and white.

EXAMPLE 4

8.3 parts of cellulose acetate (39.1% acetyl and viscosity at 10% concentration in acetone at 25° C. of 500 cps.) with a moisture content of 3.4% were placed in a jacketed sigmabladed mixer together with 1.3 parts distilled water and 8.3 parts of glacial acetic acid. The mixture was stirred and heated to 180° F. over a period of 30 minutes. A mixture consisting of 0.236 part 95% sulfuric acid dissolved in 0.5 part acetic acid was added to the reaction mass. The temperature was maintained at 180° F. until a viscosity of 3.4 seconds and an acetyl content of approximately 29% was obtained. See Example 1. One half of a mixture of 0.248 part 86% magnesium carbonate and 1.05 parts acetic acid were then added to the mixer and the balance was added over a period of 20 minutes. At this time a small sample of the reaction solution was removed, precipitated in isopropanol and washed and dried. The cellulose acetate was found to have a combined acetyl content of 29%. 1.125 parts sodium acetate and 7.5 parts 95% hexahydrophthalic anhydride were then added to the reaction mixture and the mass was stirred for one hour at 180° F. At this time the 0.5 part 97% acetic anhydride was added to the mixer over a period of 15 minutes and the temperature maintained at 180° F. The mixture was then heated and stirred for 3 hours at 180° F.

The product was precipitated by pouring the reaction solution into a comminutor together with a stream of distilled water at a rate such that the final product was obtained in the form of a fine granular powder. The precipitated product was washed in successive changes of warm distilled water until substantially free from uncombined acids and dried. The dry product analyzed as follows: 38.9% combined hexahydrophthalyl; 1.1% free hexahydrophthalic acid; 11.6% acetyl; viscosity at 15% concentration in 3A alcohol/methyl Cellosolve/water-5/3/2 at 25° C. of 32 cps.; relative hydrolytic stability of 93.

In this example about 1.67 $H_2O$ parts were supplied by the various materials which had been added to the reaction mixture through the completion of the hydrolysis. Approximately 0.48 part of this water supplies the hydroxyl in the hydrolysis operation, leaving 1.19 parts of water. If the assumption is made that all the available hydroxyl in the cellulose acetate, 29% acetyl content, reacts with hexahydrophthalic anhydride in the bath then approximately 0.02 part of water would be used up in converting to the acid form the "excess" hexahydrophthalic anhydride, leaving 1.17 parts of water. Complete elimination of this water would require about 6.8 parts of 97% acetic anhydride. Since only 6.5 parts of the 97% acetic anhydride were added in this example, the anhydrous point was closely approached, but not passed. By analysis, the combined hexahydrophthalyl content of the cellulosic material at the time the acetic anhydride was added to the bath in this example was 19.3% by weight, representing 49.6% of the total percent combined hexahydrophthalyl in the final product.

EXAMPLE 5

8.15 parts of cellulose acetate (39.1% acetyl, viscosity at 10% concentration in acetone at 25° C., 486 cps.) with a moisture content of 1.6% were placed in a jacketed sgimabladed mixer together with 1.45 parts distilled water and 8.5 parts of glacial acetic acid. The mixture was heated to 180° F. and stirred to form a uniform mass.

0.236 part 95.3% sulfuric acid, 0.5 part acetic acid were added as a mixture to the reaction mass and the mass was heated and stirred until a viscosity of 3.5 seconds was obtained as determined by the method given in Example 1.

One half of a mixture consisting of 0.248 part 86% magnesium carbonate and 1.05 parts acetic acid were added to the reaction mixture and the balance of this mixture was added over a period of 20 minutes. One part sodium acetate, 6.5 parts tetrahydrophthalic anhydride were added to the mixer and the reaction temperature maintained at 180° F. for one hour.

8.5 parts 97% propionic anhydride were then added to the reaction mixture over a period of 30 minutes and the I.T. maintained at 180° F. during this time.

The reaction solution was heated and stirred at a temperature of 180° F. for a period of five hours. Cooling water was then circulated through the mixer jacket and 30 parts of cooled distilled water were added to the mixer. The mixture was stirred until a finely divided precipitate was obtained.

The product was washed in successive changes of distilled water until substantially free from uncombined acids and dried. The product analyzed as follows: Combined tetrahydrophthalyl, 36.6%; viscosity at 15% concentration in 3A alcohol/methyl Cellosolve/water/acetone-4/3/2/1 at 25° C., 35 cps. The relative hydrolytic stability as determined in Example 4 was 93. The product when dissolved at 10% concentration in a 5% solution of sodium bicarbonate in water formed a clear, uniform low viscosity solution.

EXAMPLE 6

The process described in Example 5 was repeated except that instead of propionic anhydride 10.3 parts 97% butyric anhydride were added to the reaction bath over a 30-minute period. The product prepared by this process analyzed as follows: Combined hexahydrophthalyl, 38.01; viscosity at 15% concentration in 3A alcohol/methyl Cellosolve/water/acetone-4/3/2/1 at 25° C. was 30 cps.

EXAMPLE 7

8.3 parts cellulose acetate (38.8% acetyl content, viscosity at 10% concentration in acetone at 25° C. of 500 cps.) containing 3% moisture were placed in a jacketed sigmabladed mixer together with a mixer of 8.5 parts acetic acid, 1.3 parts distilled water. The mass was stirred and heated at 180° F. until uniform.

A mixture of 0.236 part $H_2SO_4$ 95.3% and 0.5 part acetic acid were added to the mixer as rapidly as it would dissolve in the reaction mixture. The temperature of the mixture was maintained at 180° F. until a viscosity of 2.3 seconds was obtained as determined in Example 1.

One half of a mixture consisting of 0.248 part 86% magnesium carbonate, 1.05 parts acetic acid was added to the mixer and the balance of the mixture was added over a period of 20 minutes. One part sodium acetate and 7.5 parts phthalic anhydride were added to the mixer and the reaction heated and stirred for one hour. At the end of this time 5.8 parts 97% acetic anhydride were added to the bath which was maintained at 180° F. The bath was heated and stirred four hours and at the end of this time the reaction solution was precipitated by passing it through a comminutor together with sufficient distilled water to form a uniform finely divided product. The product was washed in successive changes of warm distilled water until substantially free from uncombined acids and dried. The dry product analyzed as follows: Phthalyl, 31.6%; viscosity at 15% concentration in 3A alcohol/methyl Cellosolve/water-5/3/2 at 25° C.=28 cps.

EXAMPLE 8

708 parts of cellulose butyrate with a hydroxyl content of 2.58%, a butyryl content of 52.6%, intrinsic viscosity (in methylene chloride=9:1) of 0.5, and a moisture content of 1.1 weight percent are placed into a jacketed sigma-bladed mixer together with 15.8 parts of sodium acetate and 969 parts of acetic acid. This mixture is stirred and heated to and at a temperature of 180° F. until a uniformly clear liquid is obtained. 158 parts of hexahydrophthalic anhydride (a stoichiometric amount) preheated to a temperature of 150° F., is then blended into the clear liquid over a period of five minutes (with continuous stirring), while maintaining the resulting reaction mixture at about 180° F. This temperature is maintained in the reaction mixture for one hour.

Then 80 parts of 98% acetic anhydride are gradually added to the reaction mixture, over a period of about 15 minutes. The resulting mixture is stirred for three more hours (at 180° F.). At the end of this period of time, cooling water is circulated through the mixer jacket. 3000 parts of distilled water is then blended into the reaction mixture, with continuous stirring until a uniform, granular slurry is formed. This product is then filtered, comminuted, and washed with several successive charges of 140° F. distilled water until it is substantially free of uncombined acids, whereupon it is dried. The dried product is found to have a combined hexahydrophthalyl content of 9.3%. This is about half of the (theoretical) amount that can be obtained by simply continuing the reaction time for several additional hours. This is also to be compared with a product made conventionally (at 180° F. for 3 hours using a stoichiometric amount of hexahydrophthalic anhydride) having at most a few percent of combined hexahydrophthalyl. The viscosity of the product of Example 8 (at 25° C. and 10 weight percent in acetone) is 8 centipoises.

EXAMPLE 9

In a process like that Example 8, in which 803 parts of cellulose acetate butyrate containing 13.1% acetyl, 36.5% butyryl, 2.1% hydroxyl and 0.4% moisture are blended together initially with 13 parts of water, 1112 parts of acetic acid and 7.2 parts of sodium acetate, and the resulting mixture is reacted with 145 parts of hexahydrophthalic anhydride, while 72 parts of 98% acetic anhydride are added after about a third of the hexahydrophthalylation has been accomplished, practically complete (stoichiometric) reaction with the hexahydrophthalic anhydride can be accomplished, using a total reaction time of about 12 hours.

EXAMPLE 10

8.14 parts of ethyl cellulose having an ethoxyl content of 45.8%, a hydroxyl content of 5.2%, a viscosity of 25° C. at 5% concentration in toluene-ethanol (4:1) of 113 cps. and containing 1.4% moisture were mixed with 10 parts of acetic acid in a jacketed sigma-bladed mixer. The mixture was stirred and heated to a temperature of 180° F. until a uniform solution was obtained. 4 parts of sodium acetate and 7.5 parts of tetrahydrophthalic anhydride were added to the mixer and the mixing was continued with the temperature maintained at 180° F. for 1 hour. 0.8 part 97% acetic anhydride was then added to the mixer and the mixture was stirred for 3 hours at 180° F. At the end of this time, cooling water was circulated through the mixer jacket. 30 parts of distilled water was added to the mass and the mixture was stirred until a uniform granular slurry was obtained. The product was comminuted washed in successive changes of 140° F. distilled water until substantially free from uncombined acids whereupon it was dried. The desired product had a combined tetrahydrophthalyl content of 24.8% and a viscosity at 3% concentration in ethanol-isopropanol-n-butanol (7:2:1) at 25° C. of 28 cps. relative hydrolytic stability, 98.

EXAMPLE 11

The above procedure was repeated except that 7.6 parts hexahydrophthalic anhydride were used as the dicarboxylic acid anhydride there was thus obtained as the product ethyl cellulose hexahydropthhthalate having a combined hexahydrophthalyl content of 26.6% and a viscosity of 308 cps. at 25° C. at 10% concentration in ethaonol-acetone (55:45). Relative hydrolytic stability 100.

EXAMPLE 12

429 parts of ethyl cellulose having 45.8% combined ethoxyl, a moisture content of 1%, a hydroxyl content of 5.2%, and a viscosity of 113 cps. at 25° C. at 5% concentration in toluene-ethanol (4:0). 495 parts of 99.8% acetic acid and 17½ parts 97% hydroxylamine sulfate were placed in a jacketed sigma-bladed mixer and heated and stirred to a temperature of 125° F. until a uniform solution was obtained. A mixture of 9.85 parts of 94.9% sulfuric acid and 15.5 parts of 99.8% acetic acid was added to the mixer and the mixture was continued with the temperature maintained at 125° F. until the ethyl cellulose had a viscosity and 63 cps. This viscosity was determined from a mixture of 20 grams of the reaction solution and 20 ccs., of 9.8%, acetic acid as the time required for a ³⁄₃₂ inch aluminum ball to drop 7.7 cm. in a one-half inch diameter test tube at 25° C. 15 parts 86.6% magnesium carbonate were then added and the temperature was raised to 170° F. over a period of 10 minutes. There was then added 425 parts of 99.8% sodium acetate, 425 parts of phthalic anhydride and the reaction temperature was maintained at 180° F. for 2 hours while the mass was being mixed. 46 parts of 97% acetic anhydride were added and the mass was mixed for 3 hours at 180° F. whereupon cooling water was then circulated through the jacketed mixer and 2000 parts of distilled water at 34° F. was added to the mixer. The mixture was stirred while cooling until a uniform slurry resulted. The slurry was then passed through a comminutor to insure uniform particle size and was drained. The finely divided product was washed in successive changes of distilled water at 130° F. until substantially free from uncombined acids and was then dried at 140° F. The dry ethyl cellulose phthalate had a phthalyl content of 23.8% and a viscosity at 3% concentration in ethanol-isopropanol-n-butanol (7:2:1) at 25° C. of 5.00 cps.

EXAMPLE 13

The following were placed in a jacketed sigmabladed mixer: 1200 parts of 98.8% acetic acid, 1070 parts of ethyl cellulose having a combined ethoxyl of 46.2%, a moisture content of 2.2% and a viscosity at 25° C. at 5% concentration in toluene-ethanol (4:1) of 7.3 cps., 90 parts of 98.8% sodium acetate and 550 parts of 95% tetrahydrophthalic anhydride. The mixture was heated and stirred for 1 hour at a temperature of 150° F. 100 parts of 97% acetic anhydride were then added and the mixture was heated and stired for 3 hours. At the end of this time cooling water was circulated through the mixer jacket and 3000 parts distilled water was added to the mixer. The mixer was stirred and cooled until a uniform slurry was obtained. The slurry was drained and the finely divided product was washed in successive changes of 130° F. distilled water until it was substantially free of uncombined acids and was then dried. The product was an ethyl cellulose tetrahydrophthalate havign a tetrahydrophthalyl of 25.6% and a viscosity at 3% concentration in ethanol-isopropanol-n-butanol (7:2:1) at 25° C. of 2.2 cps.

It should be noted that although only a few of the cellulosic "raw" materials detailed hereinbefore have been expressly illustrated in the foregoing example, any of the cellulosic "raw" materials above can be used in these processes by following the manipulative procedures shown in these examples.

One preferred aspect of my invention involves the use as an initial starting material of cellulose acetate cotnaining 35–42% acetyl, the starting material being dissolved in a hydrolysis bath containing a lower fatty acid (such as acetic acid) and water (preferably within the range of from about 5 to about 20%) and sulfuric acid catalyst. The hydrolysis bath is heated until the acetyl content of the cellulose ester is reduced to from 26 to 34%. In this hydrolysis a high temperature such as on the order of 180° F. is conveniently used to promote speed of hydrolysis, although other lower temperatures may be used if time is not a primary consideration. After the desired hydrolysis, the acid catalyst is neutralized with magnesium carbonate or other alkaline earth metal neutralizing agent such as magnesium oxide, magnesium acetate or the like.

The cellulose esters and cellulose ether/esters prepared in accordance with my invention are particularly useful for the manufacture of coatings that are removable with alkaline solutions. Such removable coatings are made valuable backing layers or antihalation layers for photographic film. The present products are also useful in the manufacture of photographic emulsions.

The invention has been described in detail with particular reference to preferred embodiments thereof, but it will be understood that variations and modifications can be effected within the spirit and scope of the invention.

What is claimed is:

1. A process for manufacturing a polycarboxylic acid ester of a cellulosic material selected from the group consisting of cellulose esters, cellulose ethers and cellulose ether/esters which are soluble to the extent of at least about 5 weight percent in a hydrous lower fatty acid bath having a temperature of 30° C. and which contain at least about 0.1 weight percent of hydroxyl; said lower fatty acid containing from 2 to 5 carbon atoms; which process comprises the steps of
   (a) initially intermixing said cellulosic material, at least one lower fatty acid and a polycarboxylic acid anhydride to thereby form a hydrous esterification mixture; the amount of said polycarboxylic acid anhydride being at most about the stoichiometric amount required to react with the hydroxyls on said cellulosic material;
   (b) subsequently, within the period where 25–75% of the ultimate combined polybasic acyl has been combined with said cellulosic material, adding an amount of lower fatty acid anhydride to said esterification mixture; said amount of lower fatty acid anhydride being between 50% and 100% of the amount that will combine with all of the water present in said esterification mixture but not enough to react with all of said water; and
   (c) then completing the esterification.

2. A process as in claim 1, wherein said polycarboxylic acid anhydride is selected from the group consisting of phthalic anhydride, tetrahydrophthalic anhydride, hexahydrophthalic anhydride, succinic anhydride, trimellitic anhydride and maleic anhydride.

3. A process as in claim 2, wherein said cellulosic material is a cellulose ester.

4. A process as in claim 2, wherein said cellulosic material is a cellulose ether.

5. A process as in claim 2, wherein said cellulosic material is a cellulose ether/ester.

6. A process as in claim 3, wherein said cellulose ester is cellulose acetate.

7. A process as in claim 6, wherein said cellulose acetate contains from about 26 to about 34% acetyl and said amount of lower fatty acid anhydride is only enough to react with 50–98% of said water.

8. A process as in claim 7, wherein said lower fatty acid anhydride is acetic acid anhydride.

9. A process as in claim 7, wherein said polycarboxylic acid anhydride is phthalic anhydride.

10. A process as in claim 7, wherein said polycarboxylic acid anhydride is tetrahydrophthalic anhydride.

11. A process as in claim 7, wherein said polycarboxylic acid anhydride is hexahydrophthalic anhydride.

12. A process as in claim 4, wherein said cellulose ether is ethyl cellulose.

13. A process as in claim 12, wherein said ethyl cellulose contains from about 35 to about 50 weight percent ethoxyl.

14. A process as in claim 13, wherein said lower fatty acid anhydride is acetic anhydride, and said polycarboxylic acid anhydride is phthalic anhydride.

15. A process for making polycarboxylic acid esters of cellulose acetate which comprises
   (a) dissolving cellulose acetate containing from about 35 to about 42 weight percent of acetyl in a hydrolysis bath consisting essentially of acetic acid, from about 5 to about 20 weight percent of water and sulfuric acid catalyst;
   (b) hydrolyzing said cellulose acetate until its acetyl content is reduced to the range of from about 26 to about 34 weight percent;
   (c) neutralizing said sulfuric acid catalyst with an alkaline earth metal base;
   (d) blending into the resulting mixture to thereby form an esterification blend, an amount of a dicarboxylic acid anhydride selected from the group consisting of phthalic, tetrahydrophthalic, hexahydrophthalic, maleic and succinic anhydrides; said amount being at most about the stoichiometric amount required to react with the hydroxyls on said cellulose acetate.
   (e) subsequently, within the period where 25–75% of said dicarboxylic acid anhydride has reacted with said cellulose acetate, intermixing into said esterification blend an amount of lower fatty acid anhydride; said amount of lower fatty acid anhydride being more than enough to react with 50% of the water in said esterification blend, but not enough to react with all of said water; and
   (f) then completing the esterification.

16. A process as in claim 15, wherein said lower fatty acid anhydride is acetic anhydride.

17. A process as in claim 16, wherein said dicarboxylic acid anhydride is phthalic anhydride.

References Cited

UNITED STATES PATENTS 2,856,400  10/1958  Malm et al. _____ 260—225

DONALD E. CZAJA, Primary Examiner

R. W. GRIFFIN, Assistant Examiner

U.S. Cl. X.R.

96—83, 84, 87; 106—196, 197, 198; 260—227, 231